United States Patent
Lancaster (10) Patent No.: US 10,482,283 B2
(45) Date of Patent: *Nov. 19, 2019

(54) DATA BREACH DETECTION SYSTEM

(71) Applicant: Walmart Apollo, LLC, Bentonville, AR (US)

(72) Inventor: Norman Bradley Lancaster, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,234

(22) Filed: Dec. 20, 2018

(65) Prior Publication Data

US 2019/0122004 A1   Apr. 25, 2019

Related U.S. Application Data (63) Continuation of application No. 15/376,038, filed on Dec. 12, 2016, now Pat. No. 10,198,595.

(60) Provisional application No. 62/270,963, filed on Dec. 22, 2015.

(51) Int. Cl.
  *G06F 21/62* (2013.01)
  *H04L 29/06* (2006.01)

(52) U.S. Cl.
  CPC ...... *G06F 21/6245* (2013.01); *H04L 63/0876* (2013.01); *H04L 63/10* (2013.01)

(58) Field of Classification Search
  CPC .. G06F 21/6245; H04L 63/0876; H04L 63/10
  See application file for complete search history.

(56) References Cited

U.S. PATENT DOCUMENTS

| | | |
|---|---|---|
| 4,947,027 A | 8/1990 | Golightly |
| 5,892,824 A | 4/1999 | Beatson et al. |
| 7,805,606 B2 | 9/2010 | Birger et al. |

(Continued)

FOREIGN PATENT DOCUMENTS

WO   2015107346 A1   7/2015

OTHER PUBLICATIONS

International Search Report and Writen Opinion in related international patent application No. PCT/US2016/066592 dated Mar. 13, 2017.

*Primary Examiner* — Joseph P Hirl
*Assistant Examiner* — Stephen T Gundry
(74) *Attorney, Agent, or Firm* — McCarter & English, LLP; David R. Burns (57) ABSTRACT

The present disclosure deals with a system and a method to determine if an unauthorized user is attempting to access securely stored data. A user enters and stores sensitive data on a user device using a first computing system. The first computing system gathers sensitive data from the user device and stores the data on a second computing system. If the first computing system detects a potential data breach when trying to access the securely stored data, the first computing system may request the user to enter a subset of the securely stored data to confirm that the user has access to the securely stored data. The second computing system verifies the subset against the securely stored data and the securely stored data is made accessible to the user. If the second computing system is unable to verify the subset the second computing system triggers an event.

18 Claims, 4 Drawing Sheets

(56) References Cited

U.S. PATENT DOCUMENTS

| | | | |
|---|---|---|---|
| 7,885,413 B2 | 2/2011 | Vasic et al. | |
| 7,908,645 B2* | 3/2011 | Varghese | G06Q 20/341 726/4 |
| 8,495,359 B2 | 7/2013 | Etchegoyen | |
| 8,751,826 B2* | 6/2014 | O'Connor | H04L 9/0894 380/278 |
| 8,769,270 B2* | 7/2014 | Orsini | G06F 21/6209 713/165 |
| 8,885,894 B2 | 11/2014 | Rowen et al. | |
| 9,235,839 B2 | 1/2016 | Dua | |
| 9,251,331 B2* | 2/2016 | Dellago, Jr. | H04L 63/0853 |
| 9,268,651 B1 | 2/2016 | Salyers et al. | |
| 9,268,652 B1 | 2/2016 | Salyers et al. | |
| 9,274,956 B1 | 3/2016 | Salyers et al. | |
| 9,288,056 B1 | 3/2016 | Spagnola | |
| 9,419,665 B2 | 8/2016 | Ellis et al. | |
| 9,515,999 B2* | 12/2016 | Ylonen | H04L 63/062 |
| 9,559,889 B1 | 1/2017 | Vincent et al. | |
| 9,608,809 B1 | 3/2017 | Ghetti et al. | |
| 9,608,810 B1* | 3/2017 | Ghetti | H04L 9/083 |
| 9,729,524 B1 | 8/2017 | Brandwine et al. | |
| 9,742,747 B2 | 8/2017 | Manges | |
| 9,813,245 B2 | 11/2017 | Le Saint et al. | |
| 9,871,770 B2 | 1/2018 | O'Hare et al. | |
| 9,906,500 B2 | 2/2018 | O'Hare et al. | |
| 9,912,483 B2 | 3/2018 | Carlson et al. | |
| 9,935,923 B2 | 4/2018 | O'Hare et al. | |
| 9,936,442 B1 | 4/2018 | Noonan et al. | |
| 9,971,907 B2 | 5/2018 | Egorov et al. | |
| 9,984,238 B1 | 5/2018 | Roth et al. | |
| 9,985,932 B2 | 5/2018 | O'Hare et al. | |
| 9,992,170 B2 | 6/2018 | O'Hare et al. | |
| 10,075,358 B2 | 9/2018 | Kealey et al. | |
| 2002/0138351 A1 | 9/2002 | Houvener et al. | |
| 2003/0084288 A1 | 5/2003 | de Jong et al. | |
| 2005/0269401 A1 | 12/2005 | Spitzer et al. | |
| 2006/0177061 A1 | 8/2006 | Orsini et al. | |
| 2006/0273158 A1 | 12/2006 | Suzuki | |
| 2006/0282660 A1 | 12/2006 | Varghese et al. | |
| 2007/0101139 A1 | 5/2007 | Bayer et al. | |
| 2010/0257351 A1 | 10/2010 | O'Connor et al. | |
| 2012/0072723 A1 | 3/2012 | Orsini et al. | |
| 2012/0166815 A1* | 6/2012 | Orsini | G06F 21/606 713/189 |
| 2012/0265976 A1* | 10/2012 | Spiers | H04L 63/0218 713/2 |
| 2013/0268762 A1* | 10/2013 | Armatis | H04L 63/061 713/171 |
| 2013/0304646 A1 | 11/2013 | de Geer | |
| 2014/0089671 A1* | 3/2014 | Logue | H04L 63/0884 713/182 |
| 2014/0208410 A1 | 7/2014 | Dellago, Jr. | |
| 2015/0020185 A1 | 1/2015 | McDonough et al. | |
| 2015/0033305 A1* | 1/2015 | Shear | G06F 21/45 726/11 |
| 2015/0082399 A1* | 3/2015 | Wu | G06F 21/6209 726/6 |
| 2015/0128211 A1* | 5/2015 | Kirner | H04L 63/10 726/1 |
| 2015/0279156 A1 | 10/2015 | Omar | |
| 2015/0302057 A1 | 10/2015 | Kealey et al. | |
| 2016/0021084 A1* | 1/2016 | Eisen | H04L 63/10 726/7 |
| 2016/0048936 A1 | 2/2016 | Perkowski et al. | |
| 2016/0071101 A1 | 3/2016 | Winarski | |
| 2016/0104154 A1 | 4/2016 | Milov et al. | |
| 2016/0210578 A1 | 7/2016 | Raleigh et al. | |
| 2016/0239683 A1 | 8/2016 | Gujral et al. | |
| 2016/0328577 A1* | 11/2016 | Howley | G06F 19/00 |
| 2016/0337863 A1 | 11/2016 | Robinson et al. | |
| 2016/0344721 A1* | 11/2016 | Odom | G06F 9/46 |
| 2016/0352730 A1* | 12/2016 | Spagnola | H04L 63/0428 |
| 2016/0360019 A1 | 12/2016 | Ellis | |
| 2016/0364577 A1* | 12/2016 | Williams | G06F 21/86 |
| 2016/0381080 A1 | 12/2016 | Reddem et al. | |
| 2017/0070563 A1 | 3/2017 | Sundermeyer et al. | |
| 2017/0118025 A1 | 4/2017 | Shastri et al. | |
| 2017/0124385 A1 | 5/2017 | Ganong et al. | |
| 2017/0148264 A1 | 5/2017 | Pichette et al. | |
| 2017/0188232 A1* | 6/2017 | Raleigh | H04W 12/06 |
| 2017/0214714 A1* | 7/2017 | Williams | G06F 21/86 |
| 2017/0295142 A1 | 10/2017 | Schibuk | |
| 2017/0372055 A1 | 12/2017 | Robinson et al. | |
| 2018/0026787 A1 | 1/2018 | Le Saint et al. | |
| 2018/0026953 A1 | 1/2018 | Kiswani et al. | |
| 2018/0063104 A1 | 3/2018 | Manges | |
| 2018/0203990 A1* | 7/2018 | Saito | G06F 21/32 |
| 2018/0204111 A1 | 7/2018 | Zadeh et al. | |
| 2018/0234422 A1* | 8/2018 | Odom | H04L 63/10 |

\* cited by examiner

DATA BREACH DETECTION SYSTEM

CROSS-REFERENCE TO RELATED PATENT APPLICATION

This application is a continuation application of U.S. patent application Ser. No: 15/376,038 filed Dec. 12, 2016, which claims priority to U.S. Provisional Application No. 62/270,963 filed on Dec. 22, 2015, the contents of the application is hereby incorporated by reference in its entirety.

BACKGROUND

Distributed computing systems store large amounts of sensitive data that must be securely and safely stored. Inadequate security measures can leave such sensitive data vulnerable to attacks and potential data breaches by unauthorized third parties.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein are systems, methods, and non-transitory computer-readable media associated with improved computer security systems for securely storing sensitive data in a networked computing environment and protecting stored sensitive data in response to detecting potential data breaches in a networked computing environment. Embodiments of the systems, methods, and computer-readable media can provide for i securely storing sensitive data using security levels requiring one or more authorization steps. For example, a first security level for protecting sensitive data can be implemented by embodiments of the present disclosure when the system does not detect a potential data breach and a second security level can be implemented by embodiments of the present disclosure when a potential data breach is detected. The security levels can be configured to advantageous keep sensitive data safely secure in the databases and prevent any access to the sensitive data by any unauthorized users. Preventing unauthorized users access to the secure data also prevents, phishing attempts, viruses, spyware and malware on the distributed computing system, in turn improving the performance and longevity of the distributed computing system.

In accordance with embodiments of the present disclosure, a distributed computing system and a method are disclosed in which a first computing system having at least one server and a first database is selectively connected to a first user device and/or a second user device and selectively connected to a second computing system via a communications network. The second computing system can include a secured database server and a second database.

In exemplary embodiments, the first computing system can be programmed to establish a first connection between the first user device and the first computing system via the communications network in response to verification of a first data set received by the first computing system from the first user device. After the connection is established, the first computing system can receive a second data set from the first user device subsequent, where the second data set represent sensitive data to be securely stored.

In exemplary embodiments, a unique identifier is generated/assigned to the second data set by the at least one server of the first computing system and the unique identifier is stored in the first database by the at least one server. In exemplary embodiments, the unique identifier and the second data set are transmitted to the second computing system using a first encryption scheme, and the secured database server of second computer system stores the unique identifier and the second data set in the second database. The unique identifier and the second data set can be stored in the second database according to a second encryption scheme. At some time after the second data set is received by the first computing system, the first connection between the first computing system and the first user device can be terminated.

In exemplary embodiments, at some time after the first connection is terminated, a second connection can be established between the first computing system and either the first user device or a second user device in response to verification of the first data set received by the first computing system from the first user device or the second user device. In exemplary embodiments, the first computing system determines whether there is a potential data breach by an unauthorized user (e.g., a user that has not received authorization to retrieve the second data set from the user that submitted the second data set for secure storage). In exemplary embodiments, in response to determining there is not a potential data breach, the unique identifier is retrieved from the first database by the at least one server upon receiving a request for the second data set from the first user device or the second user device. In exemplary embodiments, the unique identifier is transmitted from the first computing system to the second computing system. In exemplary embodiments, the second data set is received from the secured database server of the second computing system based on the unique identifier.

In exemplary embodiments, in response to determining there is a potential data breach by an unauthorized user, the unique identifier is retrieved from the first database by the server upon receiving a request for the second data set from the first user device or the second user device. In exemplary embodiments, before the first computing system transmits a request for the second data set to the second computing system, the first computing system, having detected a potential data breach, can request that the first or second user device provide a first subset of the second data set to confirm that the first computing system is authorized to retrieve the second data set from the second computing system. In exemplary embodiments, a data string is received by the at least one server from the first user device or the second user device in response to requesting confirmation. In exemplary embodiments, the unique identifier and the data string are transmitted from the first computing system to the second computing system. In exemplary embodiments, at least one of an failure message or the second set of data is received based whether the data string matches the subset of the second data set requested by the first computing system.

In exemplary embodiments, the failure message is received in response to failure of the secured database server to match the data string to the first subset of the second data set. In exemplary embodiments, in response to the failure message, the first computing system requests a second subset of the second data set from the first user device or the second user device to confirm that the first computing system is authorized to retrieve the second data set from the second computing system. In exemplary embodiments, the at least one server receives a second data string from the first user device or the second user device in response to requesting confirmation. In exemplary embodiments, the unique identifier and the second data string are transmitted from the first computing system to the second computing system. In exemplary embodiments, at least one of a further failure message or the second set of data is received based on whether the data string matches the subset of the second data set requested by the first computing system.

In exemplary embodiments, in response to success of the secured database server in matching the first or second data string to a subset of the second data set, the first computing system receives the second data set from the second computing system and determines there is no data breach.

In exemplary embodiments, in response to determining there is no data breach, the first computing system provides, a graphical user interface (GUI) to be rendered by the first user device or the second user device. A first portion of the second data set can be rendered in clear text in the GUI and a second portion of the second data set can be excluded from being rendered in the GUI or being obfuscated in the GUI.

In exemplary embodiments, a maximum number requests for subsets of the second data set for confirmation by the first computing device is based on a pre-determined limit.

In exemplary embodiments, in response to failure of the secured database server to confirm that the first computing system is authorized to retrieve the second data within the maximum number of request, the first computing system retains an Internet Protocol (IP) address of the first user device or the second user device, retrains a media access control (MAC) address of the first user device or the second user device, blocks further requests from the first user device or the second user device for the second data set during the second connection or a future connection, blocks further requests for the second data set for a pre-determined amount of time, and/or transmits an e-mail to a verified e-mail address.

In exemplary embodiments, the potential data breach can be determined in response to at least one of, the first computing system being unable to verify the first data set upon initial receipt of the first data set from the first user device or the second user device when attempting to establish the second connection, the first computing system determining that a geographic location of the first user device or the second user device is suspicious, and/or the first computing system determining the first user device or the second user device is in a location which is not within a threshold distance of a known previous location.

In exemplary embodiments, the first computing system receives the second data set from second computing system in an encrypted format.

Figure 1:
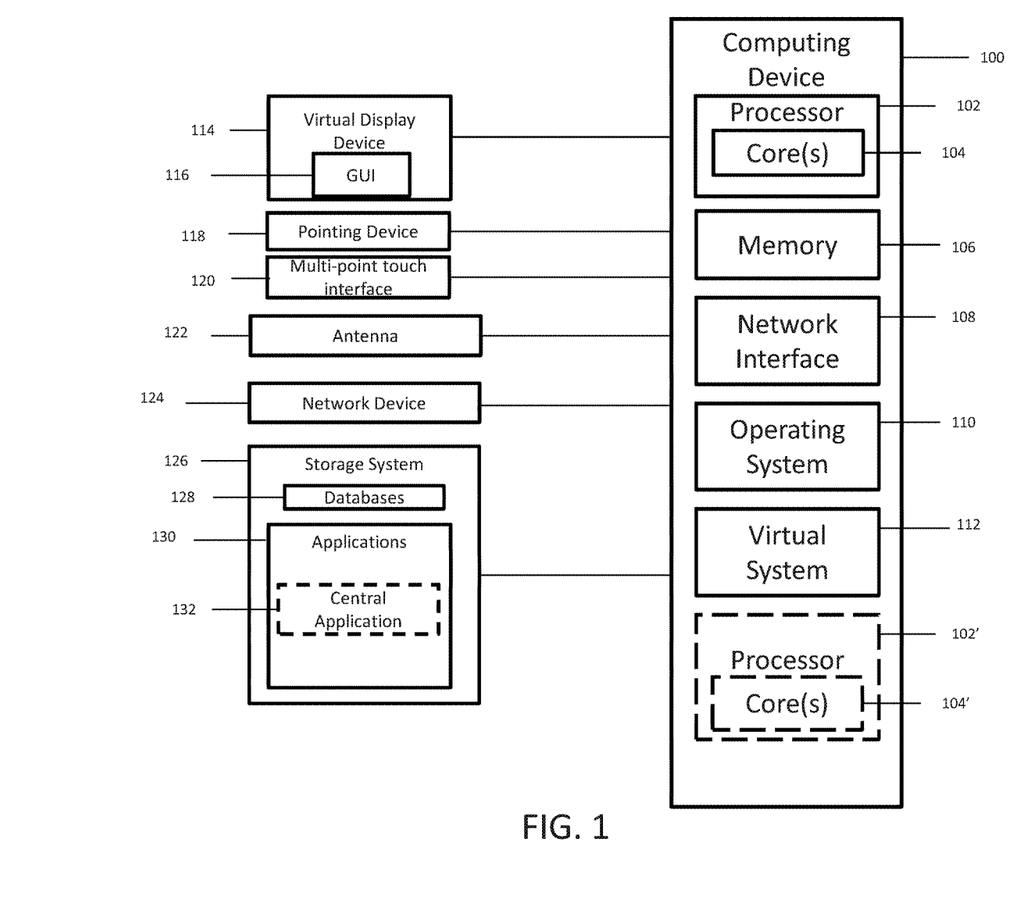
FIG. 1 is a block diagram of an example computing device for implementing exemplary embodiments of the present disclosure.

FIG. 1 is a block diagram of an example computing device 100 that may be used to implement exemplary embodiments of the present disclosure. The computing device 100 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 106 included in the computing system 100 may store computer-readable and computer-executable instructions or software (e.g., applications 130) for implementing exemplary operations of the computing device 100. The computing device 100 also includes configurable and/or programmable processor 102 and associated core(s) 104, and optionally, one or more additional configurable and/or programmable processor(s) 102' and associated core(s) 104' (for example, in the case of computer systems having multiple processors/cores), for executing computer-readable and computer-executable instructions or software stored in the memory 106 and other programs for implementing exemplary embodiments of the present disclosure. Processor 102 and processor(s) 102' may each be a single core processor or multiple core (204 and 204') processor.

Virtualization may be employed in the computing system 100 so that infrastructure and resources in the computing system 100 may be shared dynamically. A virtual machine 112 may be provided to handle a process running on multiple processors so that the process appears to be using only one computing resource rather than multiple computing resources. Multiple virtual machines may also be used with one processor.

Memory 106 may include a computer system memory or random access memory, such as DRAM, SRAM, EDO RAM, and the like. Memory 106 may include other types of memory as well, or combinations thereof.

A user may interact with the computing system 100 through a visual display device 114, such as a computer monitor, which may display one or more graphical user interfaces 116, multi touch interface 120, and a pointing device 118.

The computing device 100 may also include one or more storage devices 126, such as a hard-drive, CD-ROM, or other computer readable media, for storing data and computer-readable instructions and/or software that implement exemplary embodiments of the present disclosure (e.g., applications). For example, exemplary storage device 126 can include one or more databases 128 for storing information, such as current product data including current pricing, market rules, and price gap goals and suggested data for storing the calculated new pricing suggested data. The databases 128 may be updated manually or automatically at any suitable time to add, delete, and/or update one or more data items in the databases.

The computing device 100 can include a network interface 108 configured to interface via one or more network devices 124 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. In exemplary embodiments, the computing system can include one or more antennas 122 to facilitate wireless communication (e.g., via the network interface) between the computing device 100 and a network and/or between the computing device 100 and other computing devices. The network interface 108 may include a built-in network adapter, network interface card, PCMCIA network card, card bus network adapter, wireless network adapter, USB network adapter, modem or any other device suitable for interfacing the computing device 100 to any type of network capable of communication and performing the operations described herein.

The computing device 100 may run any operating system 110, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 100 and performing the operations described herein. In exemplary embodiments, the operating system 110 may be run in native mode or emulated mode. In an exemplary embodiment, the operating system 110 may be run on one or more cloud machine instances.

Figure 2:
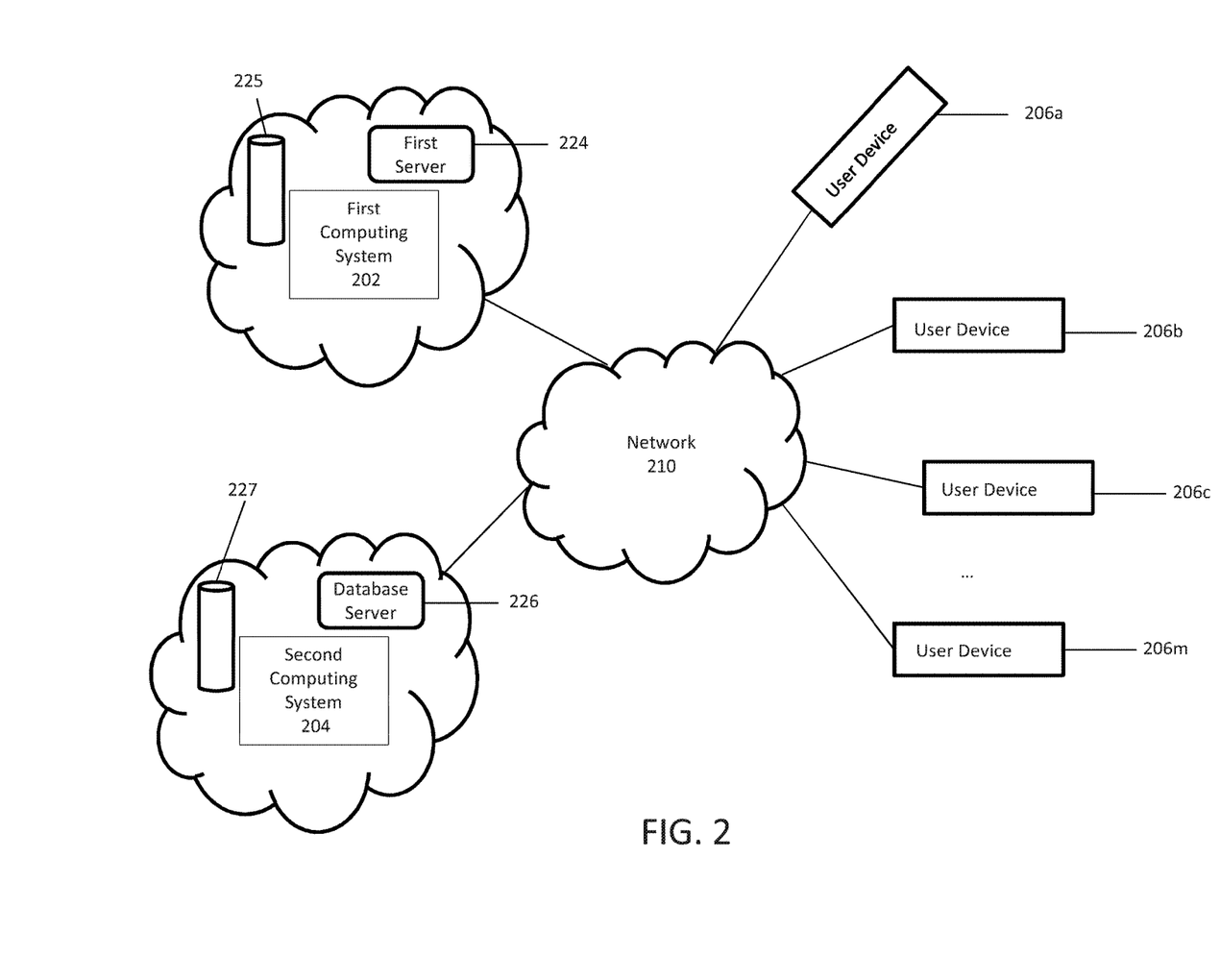
FIG. 2 illustrates an exemplary distributed environment including communicatively coupled computing systems in accordance with exemplary embodiments of the present disclosure.

FIG. 2 illustrates an exemplary distributed environment ## including communicatively coupled computing systems according to exemplary embodiments. In exemplary embodiments, a second computing system 204 is in communication with a first computing system 202 via a communications network 210. In exemplary embodiments, the first computing system 204 may be in communication with user devices 206a-m via a communications network 210. In other embodiments, the first computing system 202, the second computing system 204, and the user devices 206a-m may be in communication via the different communication networks (e.g., the first and second computing system can be in communication via a first communications network and the first computing system and the user devices can be in communication with each other via a second communication network). The communications network 210 can include different components routers, switches, hubs, and/or other suitable components which can be used to form different routes between the first computing system 202 and the second computing system 204 and between the first computing system 202 and the user devices 206a-m. In exemplary embodiments, the first computing system 202 is includes a first server 224 and a first database 225. In exemplary embodiments, the second computing system 104 includes secured database server 226 and a second database 227.

In an example embodiment, one or more portions of communications network 210 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In exemplary embodiments, a user may securely store sensitive data in a secure database to be subsequently accessed. In exemplary embodiments, the sensitive information may be personal data, health data, payment card data, biometric data, or financial data. In exemplary embodiments, the first computing system 202 may selectively connected to computing devices 206a-m and selectively connected to the second computing system 204 via a communications network 210. In exemplary embodiments, the first computing system 202 and the second computing system 204 may be located in different geographic locations. In other embodiments, the first computing system 202 and the second computing system 204 may be co-located.

In exemplary embodiments, the user may, via at least one user device 206b of the plurality of user devices 206a-m, form a connection with the first computing system 202 to access or create an account, where access credentials are applied or generated before access to the account is granted. The access credentials can include a first set of data. In some embodiments, upon creation of the account with the first computing system, each time one of the user devices attempts to form a connection with the first computing system 202, the first computing system 202 can request that the user device provide the first data set. If the user device fails to provide the first data set after a specified number of attempts, the first computing system can record information about the user device, which can be used for subsequently detecting a potential data breach. Once the connection is formed between the first computing device and one of the user devices 206a-m, the connected user device (e.g., user device 206b) can request that a second data set be securely stored for use with the previously created account on the first computing system 202. In exemplary embodiments, the second data set is a discrete set of data used by the first computing system 202 to perform one or more operations. For example, the second set of data can correspond to credentials of an account unrelated to or distinct and separate from the account established with the first computing device 202. The second data set can be a user's credit card account information including credit card number, billing address, full name, security code and expiration date, and/or a user's health insurance information such as a policy number, group id, name and date of birth. In these examples, the second data set can be used to perform the operations of processing credit card transaction or insurance claims, respectively. In other embodiments, the second data set may be another discrete set of data used to perform other operations. In exemplary embodiments, the first data set may be a user name and password.

In response to successfully logging into the account, the first server 224 of the first computing system 202 may establish a first connection between the user device 206b and the first computing system 202 via the communications network 210. A user via the user device 206b can enter the second data set to be securely stored, and can transmit the second data set to the first computing system 202. The first computing system 202 can receive the second data set from the user device 206b. The second data set may include but is not limited to a set of data including two or more of the following, the full payment card number, security code, full name of user, date of birth, expiration date, tax id, social security number, biometrics, and a billing address. Upon receipt of the second data set, the first computing system can request a name for the second data set from the user device 206b and can assign the second data set a unique identifier. The first computing system 202 can associate the unique identifier with the name provided by via the user device 206b and can store the name and the unique identifier in the first database 225 via the first server 224. In exemplary embodiments, the name can be a "nickname" created by the user for the second data set and the unique identifier can be a string of alphanumeric characters generated by the first computing system 202. The first computing system 202 can transmit the unique identifier and the second data set to the second computing system 204 using a first encryption scheme. The unique identifier and the second data set may be stored in the second database 227 by the secured database server 226 according to a second encryption scheme. At some time after the first computing system 202 associates the second data set with the unique identifier, the first connection between the first computing system 204 and the user device 206*b* can be terminated, e.g., by the first computing system 202.

In exemplary embodiments, after the first connection is terminated, a user device may wish to have the first computing system 202 retrieve the second data set. For example, a user via one of the user devices 206*a-m* (e.g., user device 206*b* or user device 206*c*) can attempt to connect to the first computing system 202. Upon receiving the first data set from the user device (e.g., user device 206*b* or user device 206*c*), a second connection between the user device and the first computing system 202 can be established. Once the connection has been established, the user device can request that the first computing system retrieve the second data set by selecting the name given to the second data set (e.g., when the second data set was initially received), upon which the first computing system 202 can retrieve the unique identifier assigned to the second data set using the name. In response to attempting to access the securely stored second data set, the first computing system 202 can determine whether a potential data breach has been detected.

In exemplary embodiments, in response to not detecting a potential data breach If not, the first computing system can base its authorization for retrieving the second data set based on the verification of the first data set by which the second connection was established, and the first computing system 202 can transmit the unique identifier to the second computing system 204. The second computing system 204 queries the second database 227, via the secured database server 226, for the second data set using the unique identifier. The second computing system 204 encrypts and transmits the second data set, via the secured database server 227 to the first computing system 202. The first computing system 202 receives and decrypts the second data set from the second computing system 204, and via the first server 224, can render at least a first portion of the second data set rendered in a graphical user interface provided by the first computing system to the user device as clear text and can exclude or obfuscate at least a second portion of the second data set in the graphical user interface. For example, the first computing system 202 may only display 4 digits of the user's social security number and billing zip code in clear text while the rest of the second data set may be represented by asterisks.

In exemplary embodiments, the first computing system 202 may detect a potential data breach if first computing system 202 determines a location of the at least one user device 206*b* is suspicious or the first computing system 202 determines the at least one user device 206*b* is in a location which is not within a threshold distance of a known previous location. In other embodiments, the first computing system 202 can detect a potential data breach if the first computing system 202 fails to verify the first data set a multiple number of times. For example, if the user has a series of failed login attempts the computing system 202 can detect a potential data breach. In exemplary embodiments, if the first computing system 202 detects a potential data breach by an unauthorized user, in response to a request that the first computing device retrieve the second data set, the first computing system 202 can request the user device (e.g., the user device 206*b* or 206*c*) for a first subset of the second data set to confirm that the first computing system 202 is authorized to retrieve the second data set from the second computing system 204. For example, where the second data set includes a payment card number, a billing address, a date of birth, or a security/pin code, the user device can be requested to provide (e.g., via data entry by a user of the user device) to a discrete portion of one or more of the payment card number, the billing address, the date of birth, or the security/pin code. The first computing system 202 can receive a data string entered by the user via the user device in response to the request for a subset of the second data set from the user device (e.g., the user device 206*b* or 206*c*). The first computing system 202 may the transmit the unique identifier and the data string to the second computing system 204, via the first server 224. The second computing system 204 may retrieve the requested first subset of second data set from the second database 227, via the secure database server 226 and attempt to verify the data string of the user by comparing the data string to the first subset of the second data set to ensure that the data string accurately identifies the requested first subset of the second data set. In exemplary embodiments, if the second computing system 204 is unable to verify the data string, the first computing system 202 may receive a failure message. In other embodiments, if the second computing system 204 is able to verify the data string, the second computing system 204 may transmit the entire second data set to the first computing system 202, via the secure database server 226. The first computing system 202 may receive and decrypt the second data set in encrypted format, via the first server 224.

In exemplary embodiments, if the first computing system 202 receives a failure message in response to the second computing system 204 unable to verify data string against requested first subset of the second data set, the first computing system 202 may request a second subset of the second data set from the user device (e.g., user device 206*b* or 206*c*) to confirm that the first computing system 202 is authorized to retrieve the second data set from the second computing system 204. The second subset is a discrete portion of the second data set that was not included in the first subset. For example, the user may be prompted to enter a discrete portion of the payment card number, the billing address, the date of birth, social security number, zip code, or the security/pin code. However, for example, if the first computing system 202 requested the user to enter the social security number in the request for the first subset, the first computing system 202 may not request the social security number in the request for the second subset.

The first computing system 202 may receive by the first server 224, a second data string from the at least one user device 206*b*. The first computing system 202 may transmit the unique identifier and the second data string to the second computing system 204. The second computing system 204 may retrieve the second data set the using the unique identifier, from the second database 227 via the secured database server 226. The second computing system 204 may attempt to verify the data string by comparing the data string to the second data set and verifying that the data string accurately identifies the requested second subset of the second data set. In exemplary embodiments, if the second computing system 204 is unable to verify the data string, the first computing system 202 may receive a failure message. In other embodiments, if the second computing system 204 is able to verify the data string, the first computing system 202 may receive the second data set in encrypted format. The first computing system 202 decrypts the second data set, via the first server 224.

In exemplary embodiments, the first computing system 202 may attempt to verify a maximum number of subsets from the at least one user device 206*b*. After a maximum number of subsets has been requested and the second computing system 204 is unable to verify each data string response to each requested subset the first computing system 202 may not allow the user access to the second data set. In exemplary embodiments, the first computing system 202 in response to reaching the maximum number of subsets, may determine the data is being breached by an unauthorized user. In exemplary embodiments, in response to determining there is a data breach by an unauthorized user, the first computing system 202 may block access to the user's account for a predetermined amount of time, blocks user's access to the second data set for a predetermined period of time, transmits e-mail to user's verified e-mail address, alert the payment card company, alert any official authorities, retains an Internet Protocol (IP) address of the at least one user device 206b, or retrains a media access control (MAC) address of the at least one user device 206b.

In exemplary embodiments, in response to success of the second computing system 204 in matching the data string response to a subset of the second data set, the first computing system 202 receives the entire second data set from the second computing system in encrypted format and determining there is no data breach. The first computing system 202 decrypts the second data set. The first computing system 202, via the server 224, may display on the graphical user interface of the at least one user device 206b a first portion of the second data set rendered in clear text and a second portion of the second data set excluded from the graphical user interface. For example, if the user has accessed their personal data, the first computing system 202 may only display 4 digits of the user's social security number and billing zip code in clear text while the rest of the second data set may be represented by asterisks.

The servers of the computing systems shown in FIG. 2 can include more or fewer components than the computing device 100 shown in FIG. 1.

Figure 3:
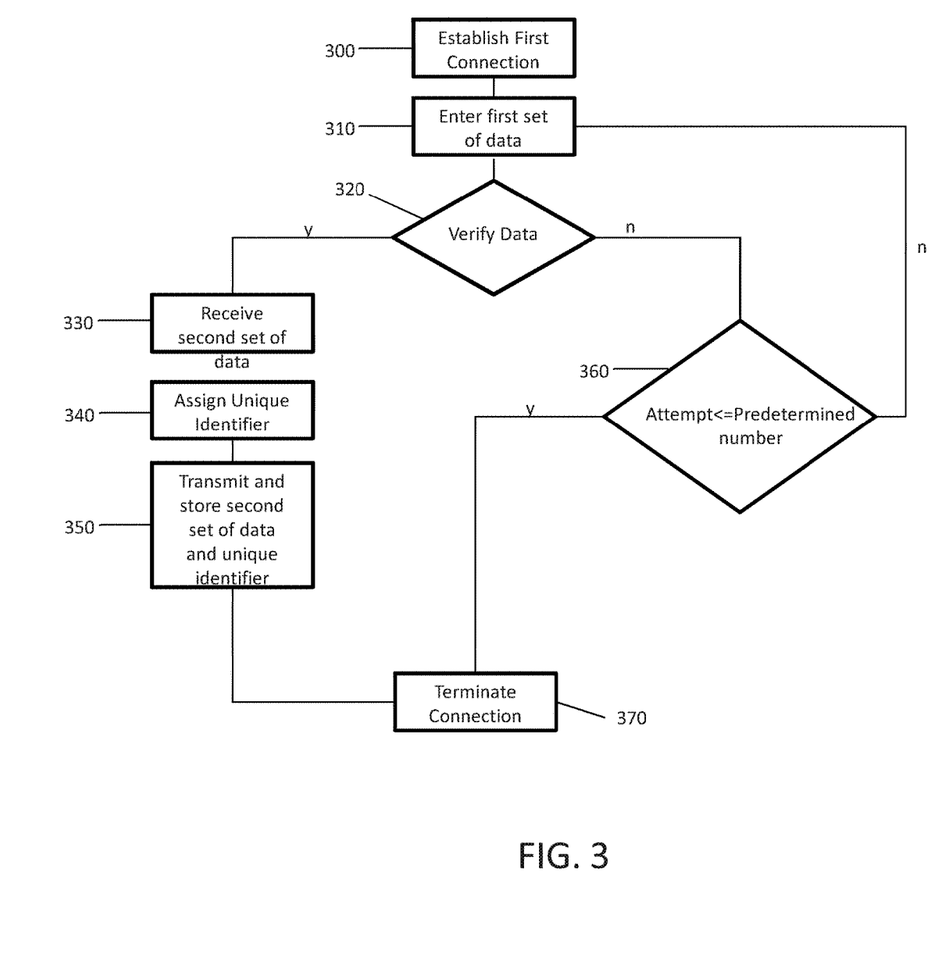
FIG. 3 is a flowchart illustrating an example process for securely storing a set of data according to exemplary embodiments.

FIG. 3 is a flowchart illustrating securely storing a set of data based on verification of another set of data according to exemplary embodiments. In exemplary embodiments, in operation 300 the first server 224 of the first computing system 202 establishes a first connection with at least one of the plurality of user devices 206a-m, via network 210. In operation 310, the user enters a first data set using at least one of the plurality of user devices 206a-m. The first computing system 202 receives the first data set. In exemplary embodiments, the first data set may be a user name in password (as well as other data such as answers to one or more security questions, an account pin).

In operation 320, the first computing system 202 verifies and authenticates, via the first server 224 the first data set. In exemplary embodiments, the first computing system 202 can fail to verify and authenticate the first data set 202. In response to failing to verify and authenticate the first data set the first computing system 202 can keep track of the number of attempts within a predetermined time period in which the first computing system 202 has failed to verify and authenticate the first data set. In operation 360, the first computing system 202 determines if the first computing system 202 has attempted to verify the data more than a maximum predetermined amount of times. In response to determining the first computing system 202 has failed to verify a maximum number of times the connection is terminated in operation 370. Conversely, in response to authentication verification of the first data set, in operation 330, the first computing system 202 requests a second data set from the at least one of the user devices 206a-m. The user may enter the second data set on at least one of the user devices 206a-m and the first computing system 202 may receive the second data set via the first server 224. In exemplary embodiments, the second data set can correspond to credentials of an account unrelated to or distinct and separate from the account established with the first computing device, Examples of data in the second data set can include personal data, payment card data, health data, biometric data, or financial data. In exemplary embodiments, the second data set may be several pieces of data required by the first computing system to perform one or more operations. In operation 340, the first computing system 202 can assign a unique identifier to the second data set and can request the at least one of user devices 206a-m to provide a name for the second data set. In exemplary embodiments, the name can be a "nick name" for the second data set and the unique identifier can be an alphanumeric string generated by the first computing system. In exemplary, the first computing system 202 encrypts the unique identifier and the second data set according to a first encryption scheme and transmits the second data set and the unique identifier to the second computing system 204, via the first server 224. In exemplary embodiments, the second computing system 204 stores the second data set and the unique identifier in the second database 227 according to a second encryption scheme. In operation 370, the first connection between the first computing system 202 and the at least one of plurality of user devices 206a-m is terminated.

Figure 4:
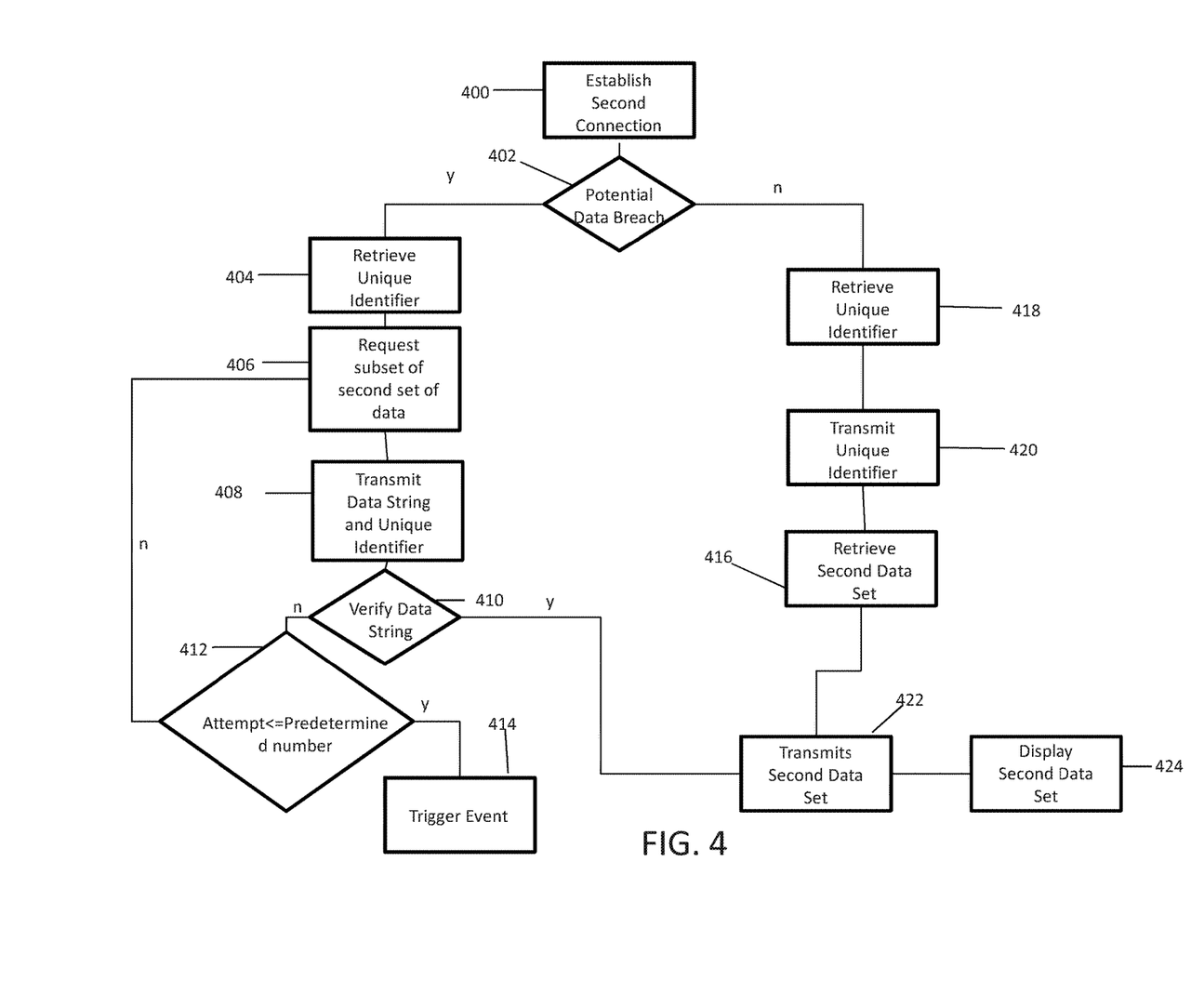
FIG. 4 is a flowchart illustrating an example process for protecting data in response to detecting a potential data breach according to exemplary embodiments.

FIG. 4 is a flowchart illustrating securing data in response to detecting a potential data breach according to exemplary embodiments. In exemplary embodiments, in operation 400 a user device attempts to request that the first computing system access the second data set. The first computing system 202 establishes a (second) connection with the at least one of the plurality of user devices 206a-m. The first computing system 202 receives a request for access to the second data set from the at least one of the plurality of user devices 206a-m. In operation 402, in response to requesting access to the second data set, the first computing system 202 determines if the request for access to the second data set is a potential data breach by an unauthorized user.

In exemplary embodiments, in operation 418, if the first computing system 202 determines that the request for access for the second data set is not a potential data breach by an unauthorized user, the first computing system 202 retrieves the unique identifier from the first database 225. In operation 420, the first computing system 202 encrypts and transmits the unique identifier of the second data set to the second computing system 204, via the first server 224. In operation 416, the second computing system 204 receives and decrypts the unique identifier, via the secured database server 226. The second computing system 204 queries the second database 227 and retrieves the second data set, via the secured database server 227. In operation 422, the second computing system 204 encrypts and transmits the entire second data set to the first computing system 202, via the secured database server 227. In operation 424, the first computing system 202 displays the second data set in a graphical user interface provided to the at least one of plurality of user devices 206a-m.

In exemplary embodiments, in operation 404, in response to the first computing system 202 determining there is a potential data breach the first computing system 202 retrieves the unique identifier of the second data set from the first database 225, via the first server 224. In exemplary embodiments, the first computing system 202 may detect a potential data breach if first computing system 202 determines a location of the at least one user device 206b is suspicious or the first computing system determines the at least one user device 206b is in a location which is not within a threshold distance of a known previous location. In operation 406, the first computing system 202 may request a subset of the second data set from the at least one of plurality of user devices 206a-m. The user may enter a data string in response to requesting the a subset of the second data set. The first computing system 202 may receive the data string and transmit the data string and the unique identifier to the second computing system 204, via the first server 224. The second computing system 204 may receive the data string, via the secured database server 226. In operation 410, the second computing system 204 will verify the data string accurately represents the requested subset of the second data set. The second computing system 204 may query the second database 227 for the second data set using the unique identifier, via the secured database server 226. The second computing system may compare the data string to the appropriate subset of the second data set. In operation 412, if the second computing system fails to verify the data string is a subset of the second data set, the second computing system 204 determines if the second computing system has reached a predetermined maximum number of attempts to verify the data string to a subset of the second data set, in operation 412. In response to determining that the maximum number of attempts has not been reached, the second computing system 204 transmits a failure message to the first computing system 202, via the secured database server 227 and the process returns to operation 406. In exemplary embodiments, in operation 406, the first computing system may request and transmit a different subset of the second data set from the at least one of the plurality of user devices 206a-m and the second computing system 204 may attempt to verify the received data strings against the second data set, until a maximum number of attempts has been reached. In exemplary embodiments, in operation 414, if the second computing system 204 determines a maximum number of attempts have been made to verify the data string against the second data set the second computing system 204 may determine the second data set is trying to be accessed by an unauthorized user and an event may be triggered. In exemplary embodiments, the event may be, the first computing system 202 may block access to the user's account for a predetermined amount of time, blocks user's access to the second data set for a predetermined period of time, transmits e-mail to user's verified e-mail address, alert the payment card company, alert any official authorities, retains an Internet Protocol (IP) address of the at least one user device 206b, or retrains a media access control (MAC) address of the at least one user device 206b.

In exemplary embodiments, in operation 416, in response to the second computing system 204 verifying the data string against the second data set, the second computing system determines there is no data breach and in operation 422, the second computing system 204 encrypts and transmits the second data set to the first computing system 202, via the secured database server 227. In operation 424, the first computing system 202 displays the second data set on the display 114 of the at least one of plurality of user devices 206a-m. The first computing system 202, via the first server 224, may decrypt and display on the graphical user interface of the at least one user device 206b a first portion of the second data set rendered in clear text and a second portion of the second data set excluded from the graphical user interface. For example, if the user has accessed their personal data, the first computing system 202 may only display 4 digits of the user's social security number and billing zip code in clear text while the rest of the second data set may be represented by asterisks.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A distributed computing system comprising:
a first computing system including at least one server and a first database, the first computing system selectively connected to a first user device or a second user device and selectively connected to a second computing system via a communications network, the second computing system including a secured database server and a second database, the first computing system configured to receive a first data set, wherein the first database is configured to store a unique identifier assigned to a second data set and the second database is configured to store the unique identifier and the second data set according to an encryption scheme;
establish a connection between the first computing system and the first user device or the second user device via the communications network in response to verification of the first data set received by the first computing system from the first user device or the second user device;
in response to determining there is a potential data breach by an unauthorized user, (i) retrieve the unique identifier from the first database by the at least one server upon receiving a request for the second data set from the first user device or the second user device, (ii) request a first subset of the second data set from the first user device or the second user device to confirm that the first computing system is authorized to retrieve the second data set from the second computing system, (iii) receive by the at least one server, a data string from the first user device or the second user device in response to requesting confirmation, (iv) transmit the unique identifier and the data string from the first computing system to the second computing system, and (v) receive at least one of a failure message or the second data set based on whether the data string matches the first subset of the second data set,
wherein the failure message is received in response to failure of the secured database server to match the data string to the first subset of the second data set, and in response to receiving the failure message, the first computing system further programmed to:
request a second subset of the second data set from the first user device or the second user device to confirm that the first computing system is authorized to retrieve the second data set from the second computing system;
receive, by the at least one server, a second data string from the first user device or the second user device in response to requesting confirmation;
transmit the unique identifier and the second data string from the first computing system to the second computing system; and
receive at least one of a further failure message or the second data set based on whether the data string matches the second subset of the second data set.

2. The system of claim 1, wherein in response to determining there is not a potential data breach, (i) retrieve the unique identifier from the first database by the at least one server upon receiving a request for the second data set from the first user device or the second user device, (ii) transmit the unique identifier from the first computing system to the second computing system, (iii) receive the second data set from the secured database server of the second computing system based on the unique identifier.

3. The system of claim 1, wherein in response to success of the secured database server in matching the data string to a subset of the second data set, the first computing system receives the second data set from the second computing system and determining there is no data breach.

4. The system of claim 3, wherein in response to determining there is no data breach, the first computing system provides, a graphical user interface (GUI) to be rendered on the first user device or the second user device, a first portion of the second data set rendered in clear text in the GUI and a second portion of the second data set excluded from the GUI.

5. The system of claim 1, wherein a maximum number requests for subsets of the second data set for confirmation by the first computing system is based on a pre-determined limit.

6. The system of claim 1, wherein in response to failure of the secured database server to confirm that the first computing system is authorized to retrieve the second data set within a maximum number of requests, the first computing system retains an Internet Protocol (IP) address of the first user device or the second user device, retains a media access control (MAC) address of the first user device or the second user device, blocks further requests from the first user device or the second user device for the second data set during the established connection or a future connection, blocks further requests for the second data set for a pre-determined amount of time, or transmits an e-mail to a verified e-mail address.

7. The system of claim 1, wherein, the potential data breach is determined in response to at least one of, the first computing system is unable to verify the first data set upon initial receipt of the first data set from the first user device or the second user device when attempting to establish a second connection, the first computing system determines a location of the first user device or the second user device is suspicious, the first computing system determines the first user device or the second user device is in a location which is not within a threshold distance of a known previous location.

8. The system of claim 1, wherein the first computing system receives the second data set from second computing system in an encrypted format.

9. The system of claim 8, wherein the first computing system decrypts the second data set.

10. A method performed in a distributed computing system, the method comprising:
receiving, via a first computing system including at least one server and a first database, the first computing system selectively connected to a first user device or a second user device and selectively connected to a second computing system via a communications network, the second computing system including a secured database server and a second database, a first data set;
storing, via the first database, a unique identifier assigned to a second data set and the second data set;
storing, via the second database, the unique identifier and second data set according to an encryption scheme;
establishing a connection between the first computing system and one of the first user device or the second user device via the communications network, a second connection established upon verification of the first data set received by the first computing system from the first user device or the second user device;
in response to determining there is a potential data breach by an unauthorized user, (i) retrieving the unique identifier from the first database by the at least one server upon receiving a request for the second data set from the first user device or the second user device, (ii) requesting a first subset of the second data set from the first user device or the second user device to confirm that the first computing system is authorized to retrieve the second data set from the second computing system, (iii) receiving, by the at least one server, a data string from the first user device or the second user device in response to requesting confirmation, (iv) transmitting the unique identifier and the data string from the first computing system to the second computing system, and (v) receiving at least one of a failure message or the second data set based on whether the data string matches the first subset of the second data set,
wherein the failure message is received in response to failure of the secured database server to match the data string to the first subset of the second data set, and in response to receiving the failure message, the method further comprises:
requesting a second subset of the second data set from the first user device or the second user device to confirm that the first computing system is authorized to retrieve the second data set from the second computing system;
receiving, by the at least one server, a second data string from the first user device or the second user device in response to requesting confirmation;
transmitting the unique identifier and the second data string from the first computing system to the second computing system; and
receiving at least one of a further failure message or the second data set based on whether the data string matches the second subset of the second data set.

11. The method of claim 10, further comprising:
in response to determining there is not a potential data breach, (i) retrieving the unique identifier from the first database by the at least one server upon receiving a request for the second data set from the first user device or the second user device, (ii) transmitting the unique identifier from the first computing system to the second computing system, and (iii) receiving the second data set from the secured database server of the second computing system based on the unique identifier.

12. The method of claim 10, further comprising:
in response to success of the secured database server in matching the data string to a subset of the second data set, receiving, by the first computing system, the second data set from the second computing system and determining there is no data breach.

13. The method of claim 12, further comprising:
in response to determining there is no data breach, providing, by the first computing system, a graphical user interface (GUI) to be rendered on the first user device or the second user device, a first portion of the second data set rendered in clear text in the GUI and a second portion of the second data set excluded from the GUI.

14. The method of claim 10, wherein a maximum number requests for subsets of the second data set for confirmation by the first computing system is based on a pre-determined limit.

15. The method of claim 14, wherein in response to failure of the secured database server to confirm that the first computing system is authorized to retrieve the second data set within a maximum number of requests, the first computing system retains an Internet Protocol (IP) address of the first user device or the second user device, retrains a media access control (MAC) address of the first user device or the second user device, blocks further requests from the first user device or the second user device for the second data set during the established connection or a future connection, blocks further requests for the second data set for a pre-determined amount of time, or transmits an e-mail to a verified e-mail address.

16. The method of claim 10, wherein, the potential data breach is determined in response to at least one of, the first computing system unable to verify the first data set upon initial receipt of the first data set from the first user device or the second user device when attempting to establish the second connection, the first computing system determines a location of the first user device or the second user device is suspicious, the first computing system determines the first user device or the second user device is in a location which is not within a threshold distance of a known previous location.

17. The method of claim 10, wherein the first computing system receives the second data set from second computing system in an encrypted format.

18. The method of claim 17, further comprising: decrypting, by the first computing system, the second data set.

* * * * *